United States Patent [19]
Fraylick et al.

[11] Patent Number: 4,738,046
[45] Date of Patent: Apr. 19, 1988

[54] VARIABLE ACTION FISHING ROD

[75] Inventors: Timothy D. Fraylick, Lexington; Dale L. Karr, Elgin, both of S.C.

[73] Assignee: Shakespeare Company, Columbia, S.C.

[21] Appl. No.: 25,993

[22] Filed: Mar. 16, 1987

[51] Int. Cl.$^4$ ............................................. A01K 87/00
[52] U.S. Cl. ........................................ 43/18.1; 43/23
[58] Field of Search .................... 43/18.5, 18.1, 22, 23

[56] References Cited

U.S. PATENT DOCUMENTS

| | | | |
|---|---|---|---|
| 1,731,173 | 10/1929 | Pope | 43/18.1 |
| 2,018,923 | 10/1935 | Potter | 43/18.1 |
| 2,478,131 | 8/1949 | Rossi | 43/18.1 |
| 3,500,570 | 3/1970 | Hubbard | 43/18.1 |
| 3,570,164 | 3/1971 | Tozier | 43/18.1 |
| 4,061,806 | 12/1977 | Lindler et al. | 43/18.5 |
| 4,214,395 | 7/1980 | Caldwell | 43/18.1 |
| 4,653,216 | 3/1987 | Inoue | 43/18.5 |

Primary Examiner—M. Jordan
Attorney, Agent, or Firm—Renner, Kenner, Greive, Bobak & Taylor

[57] ABSTRACT

The present invention is directed to a fishing rod (10) that is capable of providing a selectively variable action. That is, the rod (10) can be changed from a stiffer to a softer action not only while the rod is being prepared for casting a lure but also while the rod is being used to play a fish. The rod (10) has a sheath (13) with a handle (11) secured thereto such that the sheath (13) extends forwardly of the handle (11). The line and tip guides (14 and 15) are affixed to the sheath (13). The interior of the sheath (13) defines a hollow, preferably conical, cavity (25) that extends for at least one half the length of the sheath (13). A blade (30) that is preferably tapered in conformity with the taper of the cavity (25) within the sheath (13) is received within the cavity (25), and means (31) are provided selectively to translate the blade (30) longitudinally within the cavity (25) and thereby selectively vary the action of the rod (10).

9 Claims, 2 Drawing Sheets

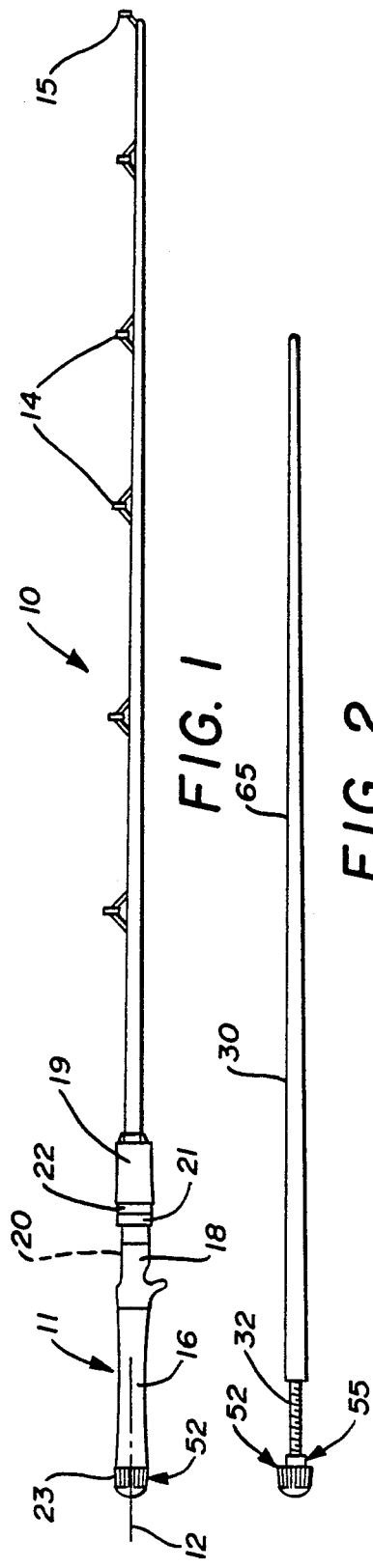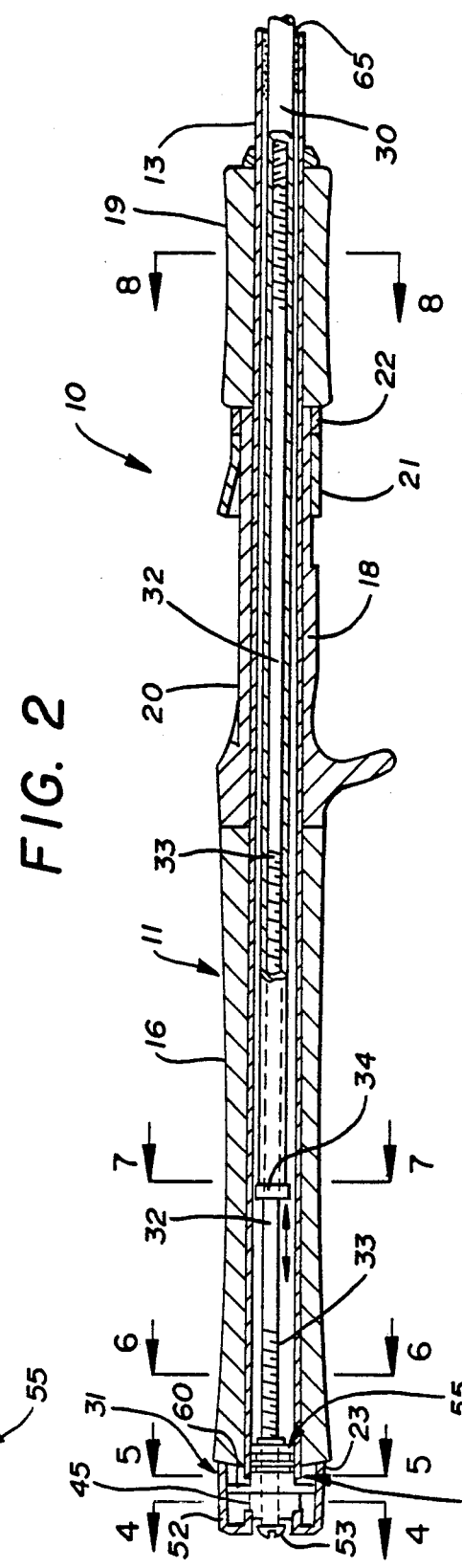

VARIABLE ACTION FISHING ROD

TECHNICAL FIELD

The present invention relates to fishing rods. More particularly, the present invention relates to fishing rods which are capable of providing selectively variable action. Specifically, the present invention relates to fishing rods having variable action that can be selectively adjusted not only while the rod is at rest but also while the rod is actually being used.

BACKGROUND OF THE INVENTION

Fishing rods had their genesis when man realized that he could enhance his ability to throw, or cast, a fishing lure, with accuracy, toward a selected target location by the use of a rod. Originally, fishing rods were made of various hardwoods such as hickory and lancewood. These varieties of wood were strong and resilient, but they were also heavy, and if sufficient care wasn't exercised, they would assume a "set." In the 1850s bamboo began to be imported into England for use in making fishing rods. Certainly, the bamboo stalk was itself used as a fishing pole, and in many areas its use still abounds, but the bamboo pole is an extremely inefficient structure for casting a lure, and it is, therefore, referred to as a pole and not a rod.

Craftsmen who make fishing rods are, however, able to take bamboo and carefully fashion it into a rod that provides classic perfection. Even so, the craftsman must know the type action desired by the fisherman for a particular rod as well as the weight of the fishing lure that will be cast by that rod in order to fashion the proper cross section, relative to the length of the rod. Once such a rod is built it is not possible to vary its action. One must have a separate rod for every action desired. Moreover, such rods are incapable of being manufactured by mass production methods.

For approximately the 25 years following the introduction of the solid steel rod in about 1920 solid steel rods were extremely popular. They could be mass-produced, and they were strong, without being overly heavy. However, they had their problems. They did rust, but their primary disadvantage was probably their tendency to fail after extended use because of metal fatigue. The solid steel rod did have adequate tensile, compressive and shear strengths which provided adequate resistance against breaking, but only until such time as the metal fatigued.

Contrary to what one might expect, the solid steel rod did not have the casting power one might expect. The solid steel rod simply did not have an appropriate modulus of elasticity to provide the desired casting power. This deficiency in the solid steel rod led to the development of the tubular steel rod which, though it exhibited greatly improved casting characteristics relative to the solid steel rod, nevertheless retained the other disadvantages inherent to metal rods.

The advent of fiberglass, and later the more exotic fibers, provided the means by which to achieve a mass-produced rod that had the desired qualities without the disadvantages of the then prior art rods.

There are two primary methods currently employed to make fiber fishing rods. According to one method the fibers are woven into a cloth that is cut to a pattern and then wound about a mandrel to provide the desired diameter and length. The cloth is impregnated with a suitable resin binder, either before or after it has been wound onto the mandrel, and that assembly of the mandrel with the impregnated cloth wound thereabout is then subjected to heat and pressure, as is well known in the art, to cure the resin impregnated cloth into a rod blank.

According to a second method the fibers are not woven into a fabric, but are, instead, positioned directly onto a mandrel in the desired disposition. In some cases the fibers are wound about the mandrel and in other cases the fibers are oriented longitudinally of the mandrel. In fact, the fibers are often applied partially longitudinally and partially circumferentially, or helically, of the mandrel.

During the early years some manufacturers chose to make the mandrel of wood which was allowed to remain within the rod as a core, but today the vast majority of manufacturers that use a mandrel to shape the rod blank choose to employ a removable, metallic mandrel. In either event, the impregnated fibers are then subjected to heat and pressure to cure the rod blank.

All of the foregoing prior art methods provide a rod of selected length which has a predetermined fast or slow action and which is designed to work most effectively with a lure of a given weight.

In order to facilitate an understanding of the present invention it is imperative that one have at least a modest understanding of how a fishing rod works so that the term "action" is understood.

A fishing rod, any fishing rod, has a modulus of elasticity. The modulus of elasticity, in layman's terms, is the composite effect of the weight of the rod and the stiffness of the rod to produce a recoil action at the tip of the rod which propels the lure. The power of this recoil action must be compatible with the weight of the lure being propelled, if the rod is to be capable of achieving the maximum range for the particular lure. The weight of the lure must neither overpower nor underpower the rod. Rather, the weight of the lure must accentuate the natural harmonic flexure of the rod so that the rod will be capable of maximizing the application of the propelling force developed by the rod to the lure.

Understanding the physical reflexes and responses of a fishing rod to the forces applied thereto by the fisherman will go a long way toward reaching an understanding of the "action" of a fishing rod. For example, if one takes a rod and holds it horizontally and then applies even a modest, horizontal, wrist flipping movement to the handle it will be observed that the tip of the rod first moves in a direction opposite to the movement applied to the handle and thereafter rebounds to move in the same direction. The time delay between the initial movement of the tip and the rebounding movement determines if the rod is a fast or slow rod. The lighter the lure, the faster is the desired action. Conversely, the heavier the lure, the slower is the desired action. In that way the weight of the lure will be able to apply an appropriate inertial force against the tip of the rod which will be in synchronization with the natural harmonic vibration of the rod and thereby enhance the degree to which the rod bends during that phase of the casting action when energy is being loaded into the rod and then allow the normal harmonic vibration of the rod dynamically to react and apply the maximum propelling force available from the rod to the lure during the unloading action.

Applying the foregoing theoretical explanation to the actual casting operation let us analyze the physical action of a rod during the casting procedure. Begin with the visualization of the fisherman holding the rod in a vertical plane and at approximately a 45° angle with respect to a horizontal plane of reference. As the fisherman starts the cast he first flips his wrist rearwardly to initiate the backcast portion of the loading phase. With or without the lure, the tip of the rod would first move forwardly, but when casting a lure as the tip begins to rebound, and move rearwardly, the static inertia of the lure momentarily detains the rebounding movement of the tip portion, thereby accentuating the initial bend to the midsection of the rod. The force applied through the rod by the rearward, flipping movement of the fisherman's wrist overcomes the initial, static inertia of the lure and causes it to accelerate rearwardly with the tip as the midsection of the rod unbends.

As the fisherman's hand reaches the rearmost extent of its travel, the rod continues to unbend, thus propelling the lure rearwardly in general conformity with the movement of the rod tip. The accomplished fisherman has developed a precise timing such that there is a momentary hesitation before he flips his wrist forwardly to initiate the casting portion of the loading phase. During that brief hesitation, the natural action of the rod produces a continued rearward deflection of the rod tip, even without the lure, but with the lure now travelling rearwardly the momentum of the lure drives the rod tip even further rearwardly, thereby continuing to load the rod. When the lure finally reverses its direction to move forwardly in response to the forward movement of the fisherman's arm and wrist, the rod is fully loaded, and the unloading phase of the casting procedure has begun.

The unloading phase is exemplified by the straightening of the rod, the bending of which had been enhanced by the action of the lure acting dynamically against the tip. It should now be apparent that if the lure is either too light or too heavy—so that it detracts rather than enhances the recoil rate of the rod—the rod will not effectively propel that lure. When the rod "action," either fast or slow, is such that it will enhance the propulsion of the lure being cast thereby, the "action" is thus appropriate for that lure.

It should also be understood that the stiffness of the rod will enhance the pleasure experienced in bringing a fish to the net. One has absolutely no control over the size of the fish that will strike the lure, and assuming that the fisherman is able properly to set the hook, the stiffness of the rod will determine the action, in this sense, the bend, that the rod will exhibit while the fisherman plays the fish to the net. The ability of a rod to bend under load —i.e., the stiffness of the rod, can also be related to the rod "action." That is, a fast action rod of a given weight will be stiffer than a slow action rod of the same weight.

Heretofore, a fisherman would be forced to choose a particular rod for the size of fish he might expect to hook on a particular day. Having thus chosen a particular rod the fisherman would be required to choose a lure having a weight that would be appropriate to the action of the rod selected. As such, he would be limited to a relatively narrow range of lure weights. Once the fisherman had selected a rod in anticipation of catching certain size fish he was unable to alter the stiffness after a fish had taken the lure.

SUMMARY OF THE INVENTION

It is, therefore, a primary object of the present invention to provide a fishing rod that permits the fisherman to adjust the action thereof to the weight of the lure that the fisherman chooses to cast.

It is another object of the present invention to provide a fishing rod, as above, that permits the fisherman to adjust the action, in this case the stiffness, of the rod to the size, and fighting spirit, of the particular fish that has been hooked, even while in the process of playing the fish to the net.

These and other objects of the invention, as well as the advantages thereof over existing and prior art forms, which will be apparent in view of the following detailed specification, are accomplished by means hereinafter described and claimed.

In general, the tubular, rod portion of a fishing rod embodying the concepts of the present invention comprises a sheath with a handle secured thereto. The interior of the sheath defines a hollow, preferably tapered, cavity that extends interiorly thereof for at least one half the length of the sheath. A blade is received within the cavity defined by the interior of the sheath, and means are provided selectively to translate the blade longitudinally within the sheath cavity.

One preferred embodiment of a fishing rod incorporating the concepts of the present invention is disclosed herein by way of example and without attempting to show all of the various forms and modifications in which the invention might be embodied; the invention be measured by the appended claims and not by the details of the specification.

BRIEF DESCRIPTION OF THE DRAWINGS

FIG. 1 is a side elevation of a fishing rod embodying the concepts of the present invention, said view depicting the sheath portion with a handle secured thereto;

FIG. 2 is a side elevation of a typical blade to be received within the cavity defined by the interior of the sheath portion of the fishing rod depicted in FIG. 1;

FIG. 3 is an enlarged, longitudinal section taken vertically through the handle of the fishing rod depicted in FIG. 1, with only enough of the sheath being included for reference;

DESCRIPTION OF AN EXEMPLARY EMBODIMENT

Figure 4:
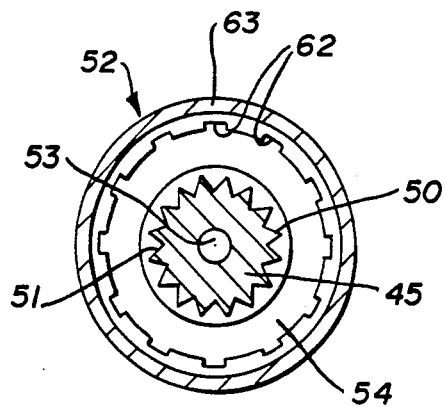
FIG. 4 is a further enlarged, transverse cross section taken substantially along line 4—4 of FIG. 3.

A fishing rod embodying the concepts of the present invention is designated generally by the numeral 10 on the attached drawings. Although the concepts of the present invention can be adapted to the individual rod styles employed for all types of fishing, the exemplary rod 10 depicted and described is of the type employed primarily for casting and spincasting. As such, the rod 10 is provided with a casting-style handle 11 that is mounted on the rear most portion of the sheath 13. As such, the rod 10—i.e., the combined handle 11 and sheath 13—will have a longitudinal axis 12.

The exterior of the sheath 13 is fitted with the customary plurality of line guides 14 and the tip guide 15 appropriate to the particular type of fishing for which the rod 10 will be employed, in this situation casting or spincasting. Accordingly, the typical handle 11 presents a grip portion 16 located rearwardly of the reel mounting portion 18 and a foregrip 19 located forwardly of the reel mounting portion 18. The reel mounting portion is provided with a reel seat 20 to receive the foot of a reel, not shown. A mounting ring 21 is slidable along at least the reel seat 20 and is selectively secured by a tightening nut 22, as is well known to the art.

The sheath 13 preferably extends longitudinally through the handle 11 for access rearwardly of the butt portion 23 of the handle 11. The interior of the sheath 13 defines a cavity 25, the mouth 26 of which opens through the butt portion 23 of the handle 11. The cavity 25 preferably extends forwardly from the mouth 26 thereof for at least one half the length of the sheath 13. When one understands the operating concept of the present invention the overall length of the cavity 25 can be selected to accommodate the design parameters desired for a particular rod 10.

A blade 30 is received within the cavity 25, and the dimensions of the cavity 25 and the blade 30 are selected to permit the blade 30 to be movable longitudinally within the cavity 25, the details of which will hereinafter be more fully explained. Means 31, as best seen in FIGS. 3 and 9, are also provided whereby selectively to control the aforesaid movement of the blade 30 within the cavity 25.

Figure 7:
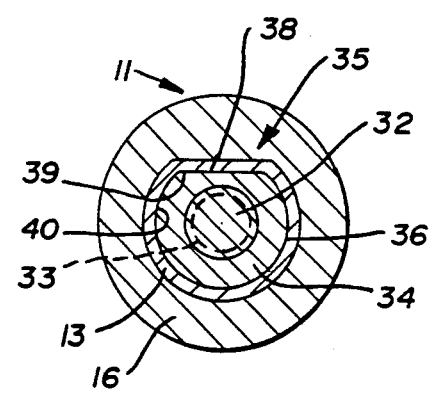
FIG. 7 is also a further enlarged cross section similar to FIGS. 4 through 6 but taken substantially along line 7—7 of FIG. 3.
Figure 8:
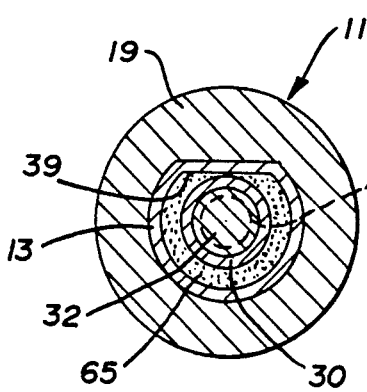
FIG. 8 is also a further enlarged cross section similar to FIGS. 4 through 7 but taken substantially along line 8—8 of FIG. 3; and, FIG. 9 is an enlarged area of FIG. 3 depicting an exemplary embodiment of means to translate the blade longitudinally within the sheath cavity.

One suitable means 31 for selectively moving the blade 30 longitudinally within the cavity 25 employs a control shaft 32 that extends longitudinally within the blade 30. The exterior of the control shaft 32 is provided with thread means 33 that operatively engage a nut 34 that is fixedly secured to the blade 30. The exterior of the nut 34 is preferably provided with a key means 35 (FIG. 7) to engage the interior of the sheath 13 and thereby preclude induced rotation of the blade 30 relative to the sheath 13 in response to rotation of the control shaft 32. The key means 35 is located along the otherwise annular exterior surface 36 of the nut 34 and constitutes the chord-like, flatted surface 38 that engages a correspondingly flatted channel 39 on the otherwise conically tapered surface 40 which circumscribes, and defines, the cavity 25 that comprises the interior of the sheath 13. Accordingly, rotation of the control shaft 32, without axial translation thereof, effects longitudinal movement of the blade 30 along the cavity 25 within the sheath 13.

The rearmost end 42 of the control shaft 32 terminates in a drive connector 45 (FIGS. 4 and 9) that is affixed thereto in such a way as to prevent relative movement therebetween. As depicted, the drive connector 45 is formed integrally with the control shaft 32. On the other hand, the rearmost end 42 of the control shaft 32 may, for example, be received within an appropriate socket, not shown, in the front face 48 of the drive connector 45 and be permanently retained therein by a suitable adhesive. In any event, at least a portion of the exterior surface 49 on the drive connector 45 is splined, as at 50, matingly to engage a splined socket 51 on the interior of a selecting knob 52 located exteriorly of the butt portion 23 on the handle 11. Engagement of the drive connector 45 may be selectively maintained within the splined socket 51 by virtue of a machine screw 53 which penetrates the hub 54 of the selecting knob 52 threadably to engage the bore 43 in the drive connector 45.

Figure 5:
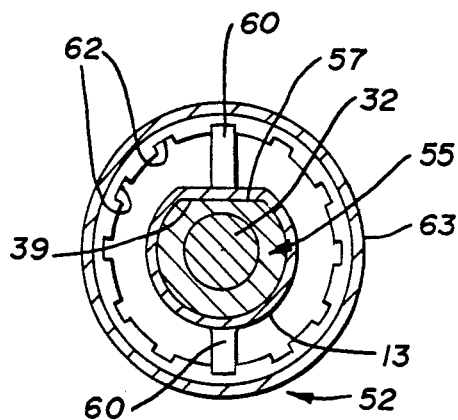
FIG. 5 is also a further enlarged cross section similar to FIG. 4 but taken substantially along line 5—5 of FIG. 3.
Figure 6:
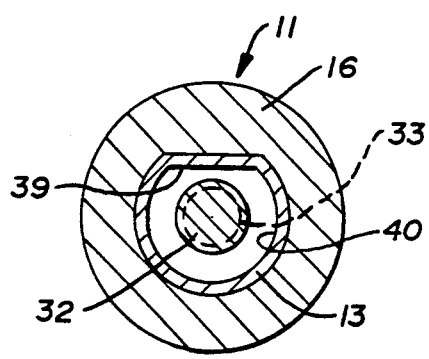
FIG. 6 is also a further enlarged cross section similar to FIGS. 4 and 5 but taken substantially along line 6—6 of FIG. 3.
Figure 9:
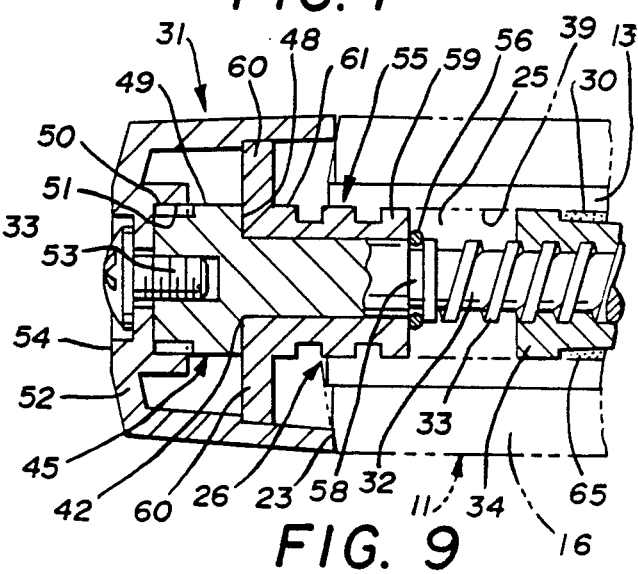

A locating connector 55, as is best seen in FIGS. 5 and 9, is supported for rotation on and about the control shaft 32 just forwardly of the drive connector 45. A spring clip 56 is receivable within an annular notch 58 incised in the control shaft 32 in order to retain the locating connector 55 in immediate juxtaposition to the front face 48 of the drive connector 45, although the two components must be permitted to rotate, one with respect to the other.

The forward portion 59 of the locating connector 55 is closely fitted to, and is received within, the mouth 26 of the cavity 25 in sheath 13 as the mouth 26 opens through the butt portion 23 of the handle 11. A suitable adhesive is preferably also employed to affix the locating connector 55 permanently within the sheath 13. In addition, a flatted, chord-like surface 57 on the forward portion 59 of the locating connector 55 engages the flatted channel 39 on the surface 40 of the cavity 25 within sheath 13 in order to assure that the locating connector 55 can not rotate relative to the sheath 13.

One or more resilient arms 60 extend radially outwardly from the rearward portion 61 of the locating connector 55 to maintain the control shaft 32 in the position selected by rotation of the knob 52 and also to serve as a tactile as well as an audible signal to apprise the fisherman that rotation of the locating knob 52 is, in fact, effecting rotation of the control shaft 32 and thereby translating the blade 30 within the sheath 13. In this latter regard, the interior of the selecting knob 52 is provided with a plurality of detents 62 located in circumferentially spaced relation about the interior of the skirt portion 63 on selecting knob 52. When the detents 62 are engaged by the resilient arms 60, rotation of the selecting knob 52 will impart a tactile as well as an audible signal as the arms 60 snap from one detent 62 into the successively adjacent detent 62. Moreover, the arms 60 will retain the selecting knob 52 in the location to which it has been rotated by the fisherman.

Generally speaking, rotation of the selecting knob 52 in one direction will translate the blade 30 to extend it into the cavity 25 within the sheath 13, and counterrotation of the selecting knob 52 will translate the blade 30 to retract it rearwardly within the cavity 25. When the blade 30 is as fully extended as the particular rod 10 permits, the rod will exhibit its greatest stiffness. Conversely, as the blade 30 is retracted, the rod will exhibit less and less stiffness. By locating the selecting knob 52 in proximity to the butt portion 23 of the handle 11 the fisherman can select the desired stiffness of the rod as easily when the rod is being used to play a fish as it can be when the rod is being prepared for a cast.

The foregoing description imparts a general understanding of the concept of the present invention, but in order to disclose one particularly suitable rod configuration let us examine an arrangement by which to maximize the desired results.

The sheath 13 may, for example, be fabricated from resin impregnated glass fibers. It is common practice to employ a plurality of glass fibers, coated with a suitable resin binder, that are compacted into the desired configuration and then so maintained until the resin cures to form the completed rod blank. Glass fibers are particularly useful in making fishing rod blanks because of their high tensile strength, their ability to withstand permanent deformation, their ability rather quickly to recover their original shape after deformation and their ready adaptability to mass production methods.

In fabricating the sheath 13, glass fibers may be woven into a cloth (an Oxford style cloth with 50% of the fibers being disposed in each direction is quite acceptable). The cloth is cut to a predetermined pattern and then wound onto, and around, a calibrated steel template, or mandrel, to impart the desired taper and size. The cloth may be impregnated with a liquid resin bonding agent either before or after it is wound onto the mandrel. In either event, the tapered mandrel, with the resin impregnated cloth wrapped therearound, is then forced into a correspondingly tapered mold cavity. The compressive force exerted between the mold and the mandrel eliminates any voids and positions the adjacent fibers in close proximity. The fiber content of such a rod blank is normally maintained between 60% to 80% of the total weight of the hollow blank so formed.

By selecting the predetermined pattern for cutting the cloth so that, when wound onto the mandrel, the fibers in one direction of the cloth lie within a plane that includes the longitudinal axis of the mandrel (which will become the longitudinal axis 12 of the rod 10) and the fibers in the other direction lie generally circumferentially of the mandrel, the resulting rod blank will have a modulus of elasticity in the range of from about 4.5 to $6.2 \times 10^6$ p.s.i. (3.08 to $4.24 \times 10^{11}$ dyn/cm$^2$).

The unit stress up to which a material may be stressed without suffering permanent deformation when the stress is removed is designated as the "elastic limit." Within the elastic limit, the ratio of the unit stress to the corresponding unit deformation is constant, and this ratio is called the modulus of elasticity. The modulus of elasticity is often referred to as a measure of stiffness, because stiffness is generally deemed to be the ability to resist deformation. It should, therefore, now be apparent that for a given unit stress the material with the largest modulus of elasticity will suffer the smallest unit deformation and will, for that reason, be the stiffest.

Insofar as fishing rods are concerned, a modulus of elasticity in the range of from about 4.5 to $6.2 \times 10^6$ p.s.i. (3.08 to $4.24 \times 10^{11}$ dyn/cm$^2$) is relatively low. Hence, such a rod would be relatively soft.

The modulus of elasticity in and of itself is not the only factor to be considered when considering rod action. In addition, one must also consider the rate at which a rod will recover its shape after the force which effected the deformation is removed. This factor, which is commonly referred to as the recoil time of the rod, depends not only on the modulus of elasticity but also on the distributed weight of the rod. If one builds a rod with an increased amount of stiffness, but without adding weight, the resulting rod would have a faster recoil time. Conversely, adding weight without increasing the stiffness results in a slower recoil time.

Finally, in order fully to understand the present invention one should recall that a fishing rod has three dynamically operational portions: the tip, the midsection and the butt. The butt of the rod, insofar as the dynamic action thereof is concerned, is the handle 11 and perhaps a short section of the rod portion located forwardly thereof. The handle, or butt, 11 is the driver. The tip portion is that portion of the rod forwardly of the foremost "nodal point" about which the rod naturally vibrates.

If one holds a rod horizontally and then rocks the handle forwardly in the horizontal plane within which the rod is disposed, the midsection will bend forwardly with the handle, but the tip will first move in a direction opposite that in which the handle is moved and will thereafter reverse its direction and move in the same direction that the handle was rocked. The point at which the tip appears to be "hinged" to the midsection is the "nodal point."

Fishing rod manufacturers have found that the action of the rod is primarily controlled by the stiffness of the midsection rather than by either the stiffness of the tip portion or the butt. Thus, the present invention must effect a change to the modulus of the midsection in order effectively to provide a variable action.

The blade 30 effects the desired change to the modulus of the midsection. Certainly, the presence of any blade 30 will effect some change to the modulus of the midsection. However, for the most desirable results the blade should be fashioned from a material that will allow the blade to bend in a parabola compatible to that at which the sheath 13 has a tendency to bend. One could, therefore, certainly employ a blade 30 that is made of the exact same material as the sheath 25, and such an arrangement would be perfectly satisfactory. On the other hand it is also quite feasible to employ a blade 30 that is fabricated from a material that has a considerably higher modulus of elasticity than the sheath 13. In that way the combined modulus of the two components working in concert can be selectively varied over a much wider range with a lesser degree of distributed weight in the overall rod. Hence, the recoil time will also be enhanced in association with an increase in the modulus of the composite rod.

To that end the blade 30 may be fabricated from one of the exotic filaments. For example, the blade may be made from a plurality of parallel, graphite filaments that are secured to a scrim. The scrim is cut to a predetermined pattern and then wound onto, and around, a calibrated steel template, or mandrel, to impart the desired taper and size to the blade 30 in exactly the same fashion as was employed to make the sheath 13.

The scrim may also be impregnated with a liquid resin bonding agent either before or after it is wound onto the mandrel, as preferred by the particular manufacturer. In either event, the tapered mandrel, with the resin impregnated scrim wrapped therearound, is then forced into a correspondingly tapered mold cavity. The compressive force exerted between the mold and the mandrel eliminates any voids and positions the adjacent graphite fibers in close proximity. The fiber content is also normally maintained between 60% to 80% of the total weight of the blade 30 so formed.

By selecting the predetermined pattern for cutting the scrim (with parallel strands of fiber bonded thereto) so that, when wound onto the mandrel, the graphite fibers lie within a plane that includes the longitudinal axis of the mandrel, the resulting blade 30 will have a modulus of elasticity in the range of from about 15.0 to $20.0 \times 10^6$ p.s.i. (1.02 to $1.36 \times 10^{11}$dyn/cm$^2$) The scrim will impart the necessary hoop strength to the blade 30.

In determining the taper for the interior cavity 25 in the sheath 13 to things must be kept in mind. First, that portion of the cavity 25 along which the nut 34 is to be moved must have the absolute minimum taper. In fact, only enough taper will be employed to be certain that the mandrel by which the cavity 25 is formed can be removed after the sheath 25 is cured. In a typical rod 10 the blade 30 will be required to translate approximately 12 to 15 inches (30.48 to 38.10 cm) within the cavity 25 to effect the desired range of rod action.

Second, the taper of the remainder of the cavity 25 must exactly conform to the taper of the blade 30. That is, when the blade has been extended to its full range of travel within the cavity the exterior of the blade should preferably conform to the interior surface 40 of the cavity 25. Naturally, this full engagement can only be achieved at one point, but that has not been found to have had any adverse effect on the operation of the rod. The spacing between the blade 30 and the cavity surface 40 can be minimized by employing a very modest taper to the to engaging surfaces. In addition, the rattling, which has been found rather disconcerting to the fisherman but which is not at all deleterious to the operation of the rod, can be obviated by interposing a filler material 65 between the blade 30 and the surface 40 of the cavity 25. The filler material can conveniently comprise a flocking that may be secured to the outer surface of the blade 30, as by an appropriate adhesive.

The selecting knob 52 can be imprinted with designators such as "heavier" and "lighter" with appropriate arrows, or other directional designators, so that the fisherman will know at a glance which rotational direction will increase the stiffness of the rod 10, and conversely, which rotational direction will decrease the stiffness of the rod.

Naturally, the hand of the thread means 33 on the control shaft 32 will determine which rotational direction will have which result, but if manufacturers uniformly adopt a convention, for example, that clockwise rotation will increase stiffness and counterclockwise rotation will decrease stiffness, fishermen will quickly learn that the action can be varied in a given manner by virtue of a known directional rotation applied to the selecting knob 52. This may not be particularly important when a fisherman is selection the desired action preparatory to casting a lure, because he will have sufficient time and opportunity to read the indicia on the selecting knob 52, but when involved in playing a fish, the fisherman does not want to take time to determine which direction he must rotate the knob 52 to effect which result to he action of the rod. At that time universality from manufacturer to manufacturer would be most greatly appreciated.

It should, therefore, now be appreciated that a fishing rod embodying the concepts of the present invention will permit facile selection of the rod action desired and otherwise accomplish the objects of the invention.

We claim:

1. A fishing rod for providing selectively variable action comprising:
   a handle having a longitudinal axis;
   a sheath secured to said handle and extending forwardly therefrom in at least general alignment with the longitudinal axis of said handle, the interior of said sheath defining a hollow cavity that extends for at least one half the length of said sheath;
   a blade being received within the cavity defined by said sheath;
   a control shaft;
   means to effect directionally selective, longitudinal translation of said blade in response to selective rotation of said control shaft relative to said blade; and
   means selectively to rotate said control shaft.

2. A fishing rod, as set forth in claim 1, wherein:
   said control shaft is insertably receivable within said blade,
   thread means operatively connect said blade to said control shaft;
   key means operatively connect between said blade and said sheath portion to preclude rotation of said blade in response to rotation of said control shaft and thereby effect longitudinal translation of said blade in a direction determined by the selective direction within which said control shaft is rotated.

3. A fishing rod, as set forth in claim 2, wherein said means selectively to rotate said control shaft comprises:
   a selecting knob affixed to said control shaft and rotatable from exteriorly of said rod.

4. A fishing rod, as set forth in claim 3, further comprising:
   resilient filler means interposed between said blade and said sheath portion.

5. A fishing rod, as set forth in claim 1, further comprising;
   a passageway extending longitudinally through said handle;
   at least a portion of said control shaft extending through said passageway in said handle;
   menas to effect directionally selective, longitudinal translation of said blade in response to selective rotation of said control shaft relative to said blade; and
   said means selectively to rotate said control shaft being located rearwardly of said handle.

6. A fishing rod, as set forth in claim 6, wherein:
   at least a portion of said control shaft is insertably receivable within said blade;
   thread means operatively connect said blade to said control shaft;
   key means operatively connect between said blade and said sheath portion to preclude rotation of said blade in response to rotation of said control shaft and thereby effect longitudinal translation of said blade in a direction determined by the selective direction within which said control shaft is rotated.

7. A fishing rod, as set forth in claim 6, wherein:
   the cavity defined by said sheath is conically tapered;
   said blade is conically tapered in at least substantial conformity with the taper of said cavity; and,
   a filling material is interposed between said blade and said sheath.

8. A fishing rod, as set forth in claim 7, wherein:
   said filling material is a flocking that is secured to said blade.

9. A fishing rod, as set forth in claim 7, wherein:
   said sheath extends through said passageway in said handle.

* * * * *